UNITED STATES PATENT OFFICE.

EMIL MEYER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOW DYE.

No. 890,588.   Specification of Letters Patent.   Patented June 9, 1908.

Application filed February 1, 1908. Serial No. 413,902.

*To all whom it may concern:*

Be it known that I, EMIL MEYER, chemist, citizen of the German Empire, residing at Elberfeld, Germany, Kingdom of Prussia, have invented new and useful Improvements in new Yellow Dye, of which the following is a specification.

My invention relates to the manufacture and production of a new and valuable dyestuff dyeing wool and silk yellow shades. The process for its production consists in condensing para-chloroquinaldin having the formula:

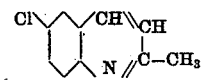

with phthalic anhydrid and treating the quinophthalone thus obtained with sulfonating agents. A yellow dyestuff is thus obtained which has a stronger coloring power and is obtained in a better yield than the known "quinolin-yellow," produced by sulfonating the condensation product derived from quinaldin and phthalic anhydrid. Furthermore the lakes of the new dye are faster to light than those of quinolin-yellow.

In order to illustrate the new process more fully the following example is given, the parts being by weight:

*Example.*—177.5 parts of para-chloroquinaldin (obtainable by treating para-chloroanilin with acetaldehyde and hydrochloric acid) are heated with 148 parts of phthalic anhydrid to 210° C. After 5 to 6 hours the reaction is complete. The chloroquinophthalone is washed with little alcohol and dried. It is a yellow powder soluble in alcohol with a yellow color.

The alcoholic solution dyes wool or silk yellow shades.

1 part of the new chloroquinophthalone is mixed with 3 parts of fuming sulfuric acid (38 per cent. of $SO_3$). The mixture is then slowly heated to 80—90° and kept at this temperature during 4—5 hours. Subsequently the product of the reaction is poured into 10 times its quantity of water and from the liquid thus obtained the sulfonic acid is precipitated by the addition of common salt.

The sodium salt of this sulfonic acid is a yellow powder soluble in concentrated sulfuric acid with a yellow color and soluble in water with a yellow color which turns reddish-yellow on addition of dilute alkali.

The new dyestuff dyes wool and silk from acid baths greenish-yellow shades.

Having now described my invention and in what manner the same is to be performed, what I claim as new and desire to secure by Letters Patent is:—

The herein-described dyestuff obtainable by condensing para-chloroquinaldin with phthalic anhydrid and treating the quinophthalone thus obtained with sulfonating agents, which product is after being dried and pulverized in the shape of its sodium salt a yellow powder soluble in concentrated sulfuric acid with a yellow color and soluble in water with a yellow color which turns reddish-yellow on addition of dilute alkali, dyeing wool and silk from acid baths greenish-yellow shades, substantially as described.

In testimony whereof I have hereunto set my hand in the presence of two subscribing witnesses.

EMIL MEYER. [L. S.]

Witnesses:
 OTTO KÖNIG,
 WM. WASHINGTON BONNSUREK.